United States Patent
Long et al.

(10) Patent No.: US 10,614,022 B2
(45) Date of Patent: Apr. 7, 2020

(54) PCIE FABRIC CONNECTIVITY EXPANSION CARD

(71) Applicant: Liqid Inc., Broomfield, CO (US)

(72) Inventors: Christopher R. Long, Colorado Springs, CO (US); Andrew Rudolph Heyd, Longmont, CO (US); James Scott Cannata, Denver, CO (US); Sumit Puri, Calabasas, CA (US); Bryan Schramm, Broomfield, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

(21) Appl. No.: 15/964,263

(22) Filed: Apr. 27, 2018

(65) Prior Publication Data

US 2018/0314667 A1    Nov. 1, 2018

Related U.S. Application Data

(60) Provisional application No. 62/491,006, filed on Apr. 27, 2017.

(51) Int. Cl.
*G06F 13/40* (2006.01)
*G06F 13/38* (2006.01)
(Continued)

(52) U.S. Cl.
CPC ...... *G06F 13/4221* (2013.01); *G06F 13/1668* (2013.01); *G06F 13/4022* (2013.01); *G06F 2213/0026* (2013.01)

(58) Field of Classification Search
CPC ............. G06F 13/40; G06F 13/38; G06F 3/06
See application file for complete search history.

(56) References Cited

U.S. PATENT DOCUMENTS 5,828,207 A   10/1998  Saadeh
6,061,750 A    5/2000  Beardsley et al.
(Continued)

FOREIGN PATENT DOCUMENTS

TW    201445317 A   12/2014

OTHER PUBLICATIONS

Aragon, Juan L. et al., "Control Speculation for Energy-Efficient Next-Generation Superscalar Processors," IEEE Transactions on Computers, vol. 55, No. 3, pp. 281-291, Mar. 2006.
(Continued)

*Primary Examiner* — David E Martinez

(57) ABSTRACT

A connectivity card insertable into a connector of a host system is provided. The connectivity card includes a plurality of Peripheral Component Interconnect Express (PCIe) connectors configured to provide external PCIe ports on the connectivity card, each of the plurality of PCIe connectors capable of carrying PCIe traffic. The connectivity card also includes a PCIe switch circuit configured to communicatively couple the plurality of connectors to a shared connectivity interface carried over a host connector of the connectivity card. The connectivity card further includes control circuitry configured to monitor for connectivity issues that arise with regard to the plurality of PCIe connectors, and responsively mitigate the connectivity issues by at least reconfiguring a communication pathway in the PCIe switch circuit for at least a portion of the PCIe traffic affected by the connectivity issues.

20 Claims, 9 Drawing Sheets

(51) Int. Cl.
*G06F 3/06* (2006.01)
*G06F 13/42* (2006.01)
*G06F 13/16* (2006.01)

(56) References Cited

U.S. PATENT DOCUMENTS

| | | | |
|---|---|---|---|
| 6,325,636 B1 | 12/2001 | Hipp et al. | |
| 7,243,145 B1 | 7/2007 | Poortman | |
| 7,260,487 B2 | 8/2007 | Brey et al. | |
| 7,505,889 B2 | 3/2009 | Salmonsen et al. | |
| 7,606,960 B2 | 10/2009 | Munguia | |
| 7,725,757 B2 | 5/2010 | Padweka et al. | |
| 7,877,542 B2 | 1/2011 | Chow et al. | |
| 8,125,919 B1 | 2/2012 | Khanka et al. | |
| 8,150,800 B2 | 4/2012 | Webman et al. | |
| 8,656,117 B1 | 2/2014 | Wong et al. | |
| 8,688,926 B2 | 4/2014 | Breakstone et al. | |
| 8,756,360 B1 | 6/2014 | Richard | |
| 8,880,771 B2 | 11/2014 | Subramaniyan et al. | |
| 9,552,316 B2 | 1/2017 | Desimone et al. | |
| 9,602,437 B1 | 3/2017 | Bernath | |
| 2002/0059428 A1 | 5/2002 | Susai et al. | |
| 2003/0110423 A1 | 6/2003 | Helms et al. | |
| 2003/0126478 A1 | 7/2003 | Burns et al. | |
| 2005/0223136 A1 | 10/2005 | Tanaka et al. | |
| 2006/0277206 A1 | 12/2006 | Bailey et al. | |
| 2007/0067432 A1 | 3/2007 | Tarui et al. | |
| 2008/0034153 A1 | 2/2008 | Lee et al. | |
| 2008/0198744 A1 | 8/2008 | Menth | |
| 2008/0281938 A1 | 11/2008 | Rai et al. | |
| 2009/0006837 A1 | 1/2009 | Rothman et al. | |
| 2009/0100280 A1 | 4/2009 | Lindsay | |
| 2009/0190427 A1 | 7/2009 | Brittain et al. | |
| 2009/0193201 A1 | 7/2009 | Brittain et al. | |
| 2009/0193203 A1 | 7/2009 | Brittain et al. | |
| 2009/0276551 A1 | 11/2009 | Brown et al. | |
| 2010/0088467 A1 | 4/2010 | Lee et al. | |
| 2011/0289510 A1 | 11/2011 | Lin et al. | |
| 2011/0299317 A1 | 12/2011 | Shaeffer et al. | |
| 2011/0320861 A1 | 12/2011 | Bayer et al. | |
| 2012/0030544 A1 | 2/2012 | Fisher-Jeffes | |
| 2012/0089854 A1 | 4/2012 | Breakstone et al. | |
| 2012/0151118 A1 | 6/2012 | Flynn et al. | |
| 2012/0166699 A1 | 6/2012 | Kumar et al. | |
| 2012/0210163 A1 | 8/2012 | Cho | |
| 2012/0317433 A1 | 12/2012 | Ellis et al. | |
| 2013/0132643 A1 | 5/2013 | Huang | |
| 2013/0185416 A1 | 7/2013 | Larkin et al. | |
| 2014/0047166 A1 | 2/2014 | Asnaashari et al. | |
| 2014/0056319 A1 | 2/2014 | Hellwig | |
| 2014/0059265 A1 | 2/2014 | Iyer et al. | |
| 2014/0075235 A1 | 3/2014 | Chandhoke et al. | |
| 2014/0103955 A1 | 4/2014 | Avritch et al. | |
| 2014/0108846 A1 | 4/2014 | Berke et al. | |
| 2014/0353264 A1 | 12/2014 | Venugopal et al. | |
| 2014/0365714 A1 | 12/2014 | Sweere et al. | |
| 2015/0074322 A1 | 3/2015 | Galles | |
| 2015/0121115 A1 | 4/2015 | Chandra et al. | |
| 2015/0186437 A1 | 7/2015 | Molaro | |
| 2015/0212755 A1 | 7/2015 | Asnaashari | |
| 2015/0261710 A1 | 9/2015 | Billi | |
| 2015/0304423 A1 | 10/2015 | Satoyama et al. | |
| 2015/0309951 A1 | 10/2015 | Breakstone et al. | |
| 2015/0347345 A1* | 12/2015 | Hellriegel | G06F 13/409 710/301 |
| 2015/0373115 A1* | 12/2015 | Breakstone | G06F 3/0685 709/217 |
| 2016/0070661 A1 | 3/2016 | Huang et al. | |
| 2016/0072640 A1 | 3/2016 | Yang et al. | |
| 2016/0147628 A1 | 5/2016 | Arroyo et al. | |
| 2016/0197996 A1 | 7/2016 | Barton et al. | |
| 2016/0248631 A1 | 8/2016 | Duchesneau | |
| 2018/0101500 A1* | 4/2018 | Heyd | G06F 13/4022 |

OTHER PUBLICATIONS

International Application No. PCT/US2017/046602, International Search Report & Written Opinion, 8 pages, dated Oct. 19, 2017.
International Application No. PCT/US2017/046607, International Search Report & Written Opinion, 7 pages, dated Oct. 23, 2017.
International Application No. PCT/US2018/029496, International Search Report & Written Opinion, 10 pages, dated Jul. 10, 2018.
Lu, Yingping et al., "Performance Study of iSCSI-Based Storage Subsystems," IEEE Communications Magazine, pp. 76-82, Aug. 2003.
Taiwanese Patent Application No. 107114399, Office Action, 14 pages, dated Jan. 18, 2019.

* cited by examiner

PCIE FABRIC CONNECTIVITY EXPANSION CARD

RELATED APPLICATIONS

This application hereby claims the benefit of and priority to U.S. Provisional Patent Application No. 62/491,006, entitled "PCIe FABRIC CONNECTIVITY EXPANSION CARD," filed on Apr. 27, 2017 and which is hereby incorporated by reference in its entirety.

BACKGROUND

Networked storage and computing systems have been introduced which store and process large amounts of data in enterprise-class storage environments. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments. Some computing devices employ Peripheral Component Interconnect Express (PCIe) interfaces to connect to peripherals and storage devices. However, typical PCIe implementations employ point-to-point host-device architectures.

OVERVIEW

In an embodiment, a connectivity card insertable into a connector of a host system is provided. The connectivity card includes a plurality of Peripheral Component Interconnect Express (PCIe) connectors configured to provide external PCIe ports on the connectivity card, each of the plurality of PCIe connectors capable of carrying PCIe traffic.

The connectivity card also includes a PCIe switch circuit configured to communicatively couple the plurality of connectors to a shared connectivity interface carried over a host connector of the connectivity card.

The connectivity card further includes control circuitry configured to monitor for connectivity issues that arise with regard to the plurality of PCIe connectors, and responsively mitigate the connectivity issues by at least reconfiguring a communication pathway in the PCIe switch circuit for at least a portion of the PCIe traffic affected by the connectivity issues.

In another embodiment, a method of operating a connectivity card insertable into a connector of a host system is provided. The method includes monitoring a plurality of external Peripheral Component Interconnect Express (PCIe) ports for connectivity issues, each of the plurality of PCIe ports capable of carrying PCIe traffic, and each PCIe port having a corresponding PCIe connector on the connectivity card, and detecting connectivity issues in one of the plurality of PCIe ports.

The method also includes mitigating the connectivity issues by reconfiguring a communication pathway in a PCIe switch circuit on the connectivity card for at least a portion of the PCIe traffic affected by the connectivity issues, the PCIe switch circuit configured to communicatively couple the plurality of PCIe ports to a shared connectivity interface carried over a host connector of the connectivity card.

In a further embodiment, one or more non-transitory computer-readable media having stored thereon program instructions to facilitate operating a connectivity card insertable into a connector of a host system is provided. The program instructions, when executed by a computing system, direct the computing system to at least monitor a plurality of external Peripheral Component Interconnect Express (PCIe) ports for connectivity issues, each of the plurality of PCIe ports capable of carrying PCIe traffic, and each PCIe port having a corresponding PCIe connector on the connectivity card, and to detect connectivity issues in one of the plurality of PCIe ports.

The program instructions further direct the computing system to mitigate the connectivity issues by reconfiguring a communication pathway in a PCIe switch circuit on the connectivity card for at least a portion of the PCIe traffic affected by the connectivity issues, the PCIe switch circuit configured to communicatively couple the plurality of PCIe ports to a shared connectivity interface carried over a host connector of the connectivity card.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
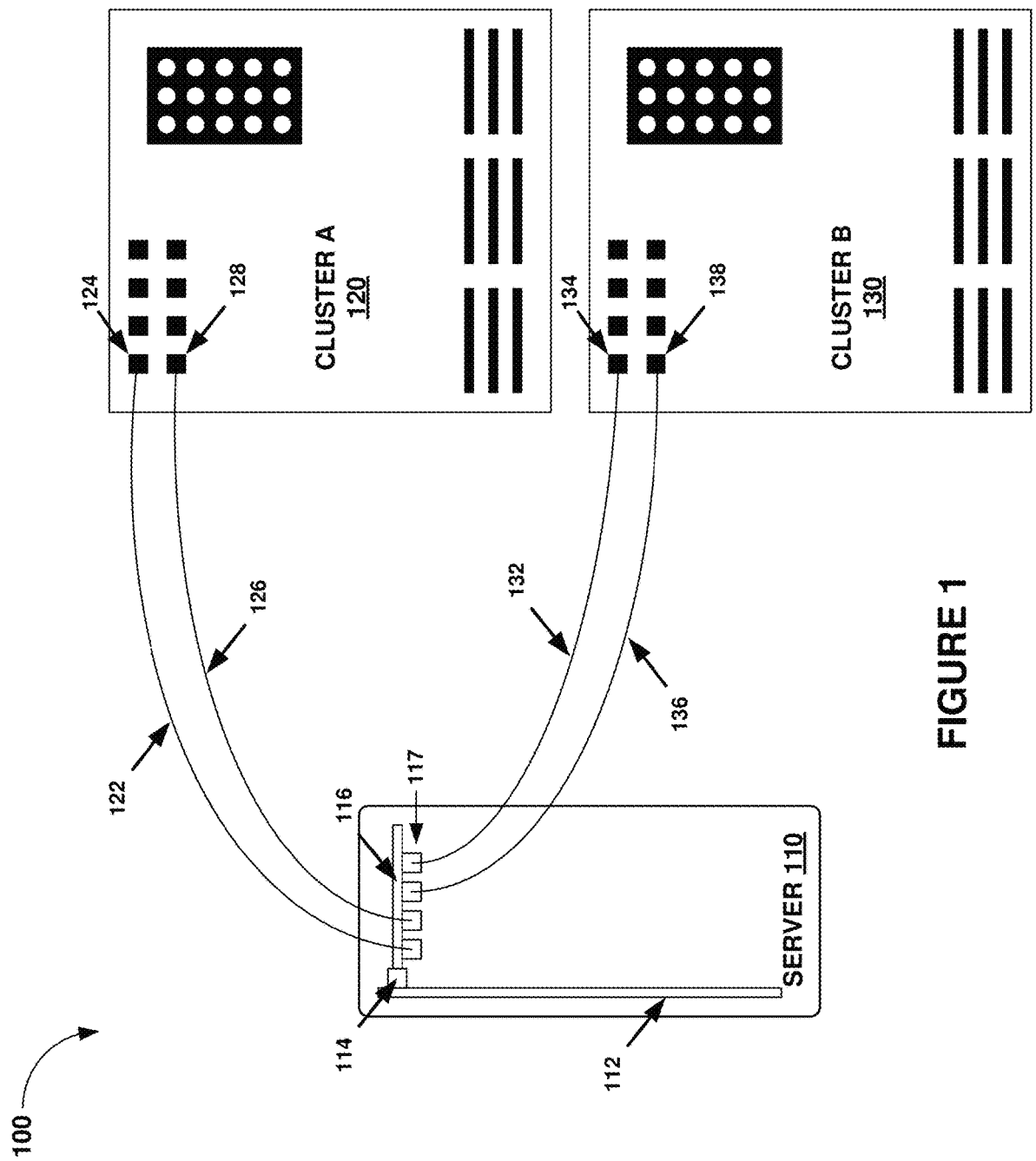
FIG. 1 is a system diagram illustrating a computing environment.

FIG. 1 is a system diagram illustrating a computing environment 100. In this example, computing environment 100 includes server 110, cluster A 120, and cluster B 130. Server 110 is coupled to cluster A 120 via PCIe links 122 and 126. Server 110 is coupled to cluster B 130 via PCIe links 132 and 136.

PCIe link 122 is connected to cluster A 120 through PCIe connector 124, and to server 110 through PCIe connector 117. PCIe link 126 is connected to cluster A 120 through PCIe connector 128, and to server 110 through PCIe connector 117. PCIe link 132 is connected to cluster B 130 through PCIe connector 134, and to server 110 through PCIe connector 117. PCIe link 136 is connected to cluster B 130 through PCIe connector 138, and to server 110 through PCIe connector 117.

Server 110 includes motherboard 112, PCIe slot 114, and connectivity card 116. Connectivity card 116 includes four PCIe connectors 117. In a prior art example, if there are connectivity issues with PCIe link 122 (perhaps it has been disconnected from PCIe connector 124), the connectivity issues may cause a cascading failure problem for server 110, referred to as a host panic condition.

However, in an example embodiment of the present invention, connectivity card 116, which has been monitoring its four PCIe connectors 117 for connectivity issues, automatically switches traffic from PCIe link 122 to PCIe link 126 upon detecting the connectivity issues. Connectivity card 116 performs this redirection of traffic automatically and in such a way that server 110 is not disrupted by the connectivity issues.

Figure 2:
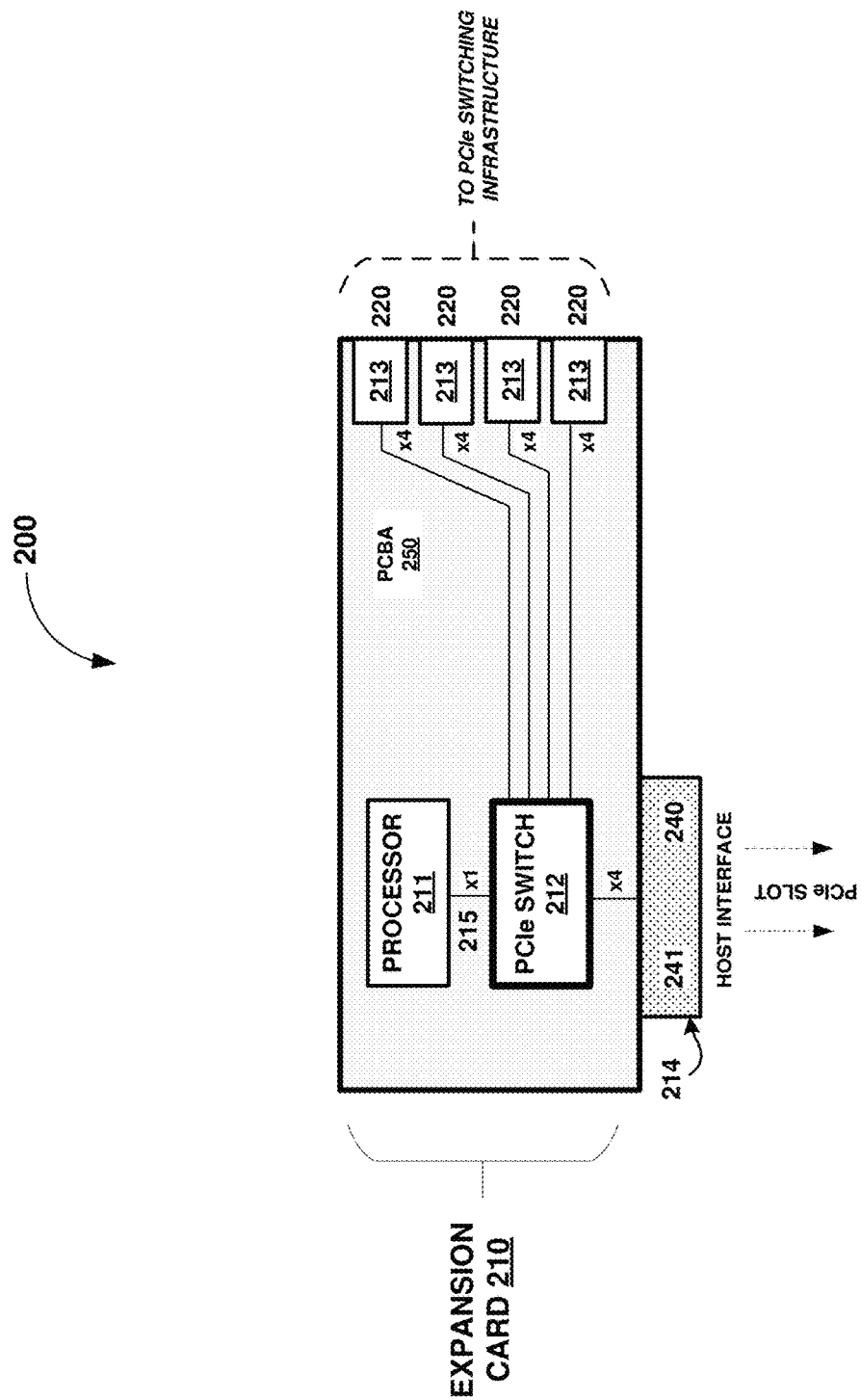
FIG. 2 is a block diagram illustrating a connectivity expansion card.
Figure 3:
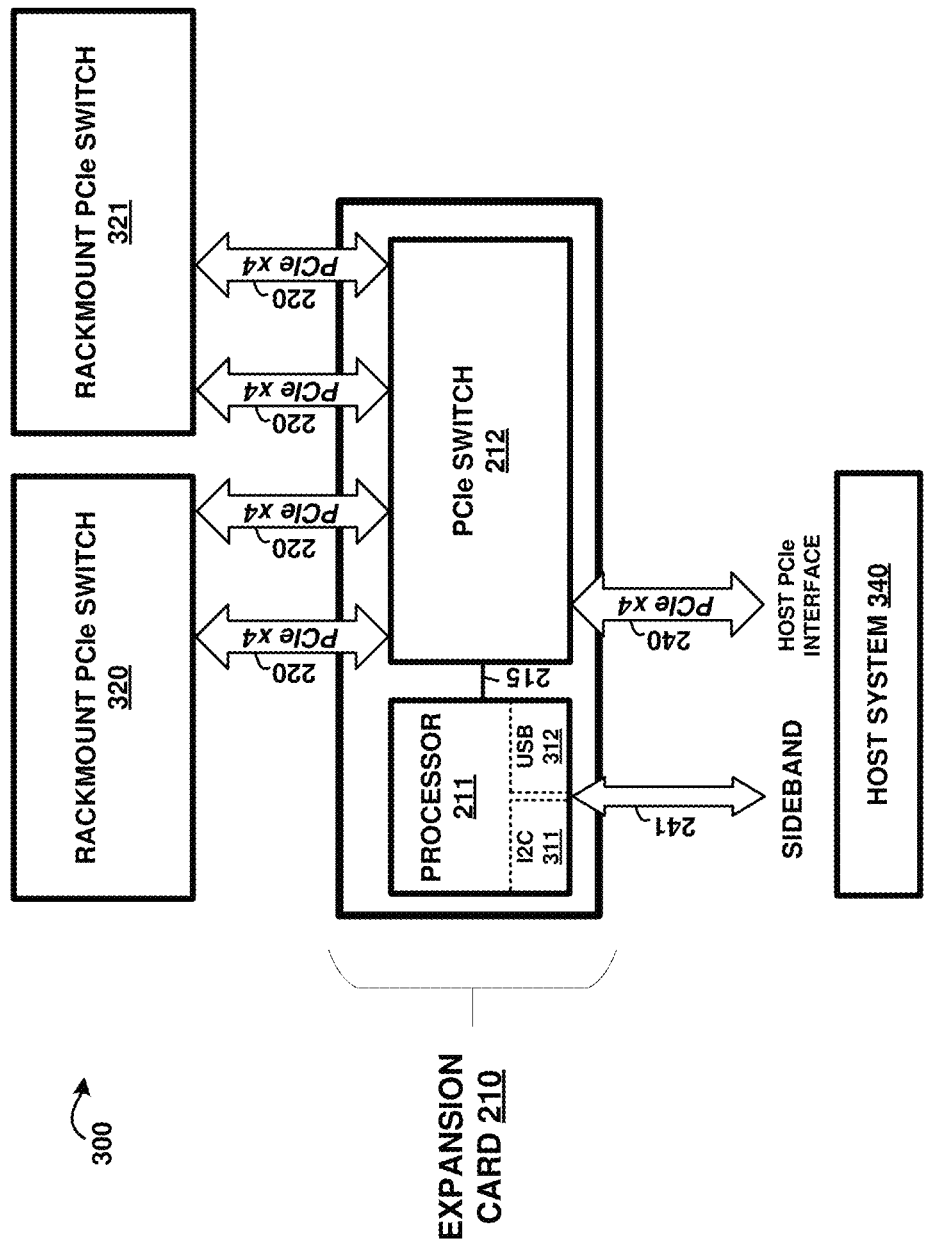
FIG. 3 is a system diagram illustrating a connectivity expansion card environment.

FIGS. 2-3 are blocks diagram illustrating connectivity expansion card 210. FIG. 2 illustrates an example physical configuration of connectivity expansion card 210 as shown for printed circuit board assembly 250. FIG. 3 illustrates an example schematic configuration of connectivity expansion card 210. Connectivity expansion card 210 includes one or more externa Peripheral Component Interconnect Express (PCIe) compatible ports 213, PCIe switch circuit 212, processor 211, and host connector 214. Processor 211 and PCIe switch circuit 212 communicate over one or more interfaces 215, which can comprise a x1 PCIe interface. PCIe switch circuit 212 and host connector 214 communicate over one or more interfaces comprising one or more PCIe lanes, such as the x4 PCIe interface shown in FIG. 2. Further communication links can be included for communication between the various elements of connectivity expansion card 210.

Connectivity expansion card 210 can comprise a HHHL (half-height half-length) PCIe peripheral or expansion card. Other card sizes can be employed, such as a FHHL (full-height half-length) or FHFL (full-height full-length), or HHFL (half-height full length), among others. PCIe edge connector 214 is insertable into a mating PCIe socket of a host system, such as a motherboard or daughterboard of a computer or server system. Connectivity expansion card 210 can receive power over one or more power links provided by the host system over connector 214.

PCIe switch circuit 212 comprises one or more PCIe switch elements and distributes PCIe communications and traffic to one or more of ports 213. PCIe switch circuit 212 is also communicatively coupled to an on-card processor 211 or control system that handles traffic monitoring, traffic statistics communication, power monitoring, and status monitoring, among other operations.

PCIe-compatible connectors 213 can be used for cluster interconnect and can comprise mini-Serial Attached SCSI (SAS) HD connectors which are employed to carry PCIe signaling over mini-SAS cabling. Other example connectors include zQSFP+, microQSFP, and OCuLink-2 interconnect. In further examples, MiniSAS HD cables are employed that drive 12 Gb/s versus 6 Gb/s of standard SAS cables, since 12 Gb/s can support PCIe Gen 3. PCIe-compatible connectors 213 can comprise mini-SAS connectors that comprise mini-SAS jacks. Associated cabling for PCIe links 220 can comprise SAS cabling which can include associated shielding, wiring, sheathing, and termination connectors.

PCIe-compatible connectors 213 are grouped into a set of four (4) ports in the examples herein to allow connections to other switches, devices, or servers with up to a x16 bus, as well as supporting x1, x4, and x8 bus widths, among others. Each PCIe-compatible connector 213 can also have included indicators (such as light-emitting diodes (LEDs)) that shine through associated PCIe port connectors to help guide customers in connecting cables, troubleshooting, and indicating connectivity and errors.

PCIe switch circuit 212 communicates with a host system or host module (not pictured) over PCIe link 240. PCIe link 240 can comprise a PCIe link with multiple lanes, such as a "x4" PCIe link, although a different number of PCIe lanes can be employed. Additionally, more than one PCIe link 240 can be employed for load balancing, redundancy, and failover protection for connectivity expansion card 210. PCIe switch circuit 212 also communicates with four external PCIe-compatible connectors 213 over associated x4 PCIe links, although a different number of links and connectors can be employed. PCIe can support multiple bus widths, such as x1, x4, x8, and x16, among others, with each multiple of bus width comprising an additional "lane" for data transfer. An example embodiment of the present invention also supports transfer of sideband signaling, such as System Management Bus (SMBus) interfaces, as well as associated clocks, power, and bootstrapping, among other signaling.

PCIe switch circuit 212 comprises one or more PCIe crosspoint switches, which logically interconnect various ones of the associated PCIe links based at least on the traffic carried by each PCIe link. PCIe switch circuit 212 establishes switched connections between any PCIe interfaces handled by PCIe switch circuit 212. Each PCIe switch port can comprise a non-transparent (NT) or transparent port or Downstream Port Containment (DCP/eDPC). An NT port can allow some logical isolation between endpoints, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port. In other examples, a domain-based PCIe signaling distribution can be included which allows segregation of PCIe ports of a PCIe switch according to user-defined groups. In some examples, PCIe switch circuit 212 comprises a PLX Technology PEX8725 10-port, 24 lane PCIe switch chip. In some examples, PCIe switch circuit 212 comprises a PLX Technology PEX8796 24-port, 96 lane PCIe switch chip.

Although host PCIe link 240 is used in FIGS. 2-3, it should be understood that additional or different communication links or busses can be employed, such as Ethernet, Serial Attached SCSI (SAS), FibreChannel, Thunderbolt, Serial Attached ATA Express (SATA Express), among other interconnect, network, and link interfaces. Any of the links in FIGS. 2 and 3 can each use various communication media, such as air, space, metal, optical fiber, or some other signal propagation path, including combinations thereof. Any of the PCIe links in FIGS. 2-3 can include any number of PCIe links or lane configurations. Any of the links in FIGS. 2-3 can each be a direct link or might include various equipment, intermediate components, systems, and networks. Any of the links in FIGS. 2-3 can each be a common link, shared link, aggregated link, or may be comprised of discrete, separate links.

Processor 211 can optionally communicate over at least PCIe link 215 and optional sideband links. Sideband links can include Universal Serial Bus (USB), SMBus, Inter-Integrated Circuit (I2C), controller area network bus (CAN), or any other communication interface, and in some examples are provided over portions of PCIe link 215. In FIG. 3, processor 211 includes I2C interface 311 and USB interface 312 for communication over sideband links 241.

I2C interface 311 and USB interface 312 can be included in separate circuitry or included in similar elements as processor 211.

Processor 211 comprises one or more microprocessors, processing devices, multi-core processors, processing circuitry, or other processing system. Processor 211 can include one or more non-transitory memory devices, such as RAM, solid state storage, or other memory to store instructions that are executable by processor 211 to operate as discussed herein. In some examples, processor 211 comprises an ARM microcontroller, ARM microprocessor, field-programmable gate array (FPGA), application specific integrated circuit (ASIC), application specific processor, or other microprocessor or processing elements. In some examples, processor 211 comprises an ARM-compatible microprocessor or microcontroller, although other circuitry can be employed. Processor 211 can comprise any processing elements discussed below for control processor 400 of FIG. 4. Processor 211 can monitor connectivity status, usage statistics, traffic status, or other usage information through link 215 or other sideband links. PCIe switch circuit 212 can monitor and store this usage information during normal operation and data transfer, and processor 211 can retrieve this usage information as needed over link 215.

Although processor 211 and PCIe switch circuit 212 are shown as separate elements in FIGS. 2-3, it should be understood that processor 211 and PCIe switch circuit 212 can be included in the same circuitry.

Holdup circuitry can optionally be included in some examples on connectivity expansion card 210 to provide power to the connectivity card when input power has been lost or removed for the connectivity card. In some examples, the connectivity card is removed from an associated mating connector and input power is lost due to the removal. In other examples, power is lost to a host system into which connectivity expansion card 210 is connected, such as during a facility power outage or when an associated power supply fails. The various holdup circuitry can also be accompanied by a power controller circuit to selectively provide power to the elements of connectivity expansion card 210.

FIG. 3 also includes system elements for example context of connectivity expansion card 210. In FIG. 3, connectivity expansion card 210 is coupled to host system 340, such as inserted into a PCIe slot of host system 340. Connectivity expansion card 210 provides PCIe ports that are external to a chassis, case, or enclosure of host system 340. These external ports carry PCIe links 220 and can be coupled over associated cabling to one or more rackmount switch elements, such as rackmount PCIe switches 320-321 in FIG. 3. In this manner, host system 340 can be coupled into a cluster or rackmount PCIe fabric using connectivity expansion card 210. Other external PCIe devices can also be coupled over links 220.

Figure 4:
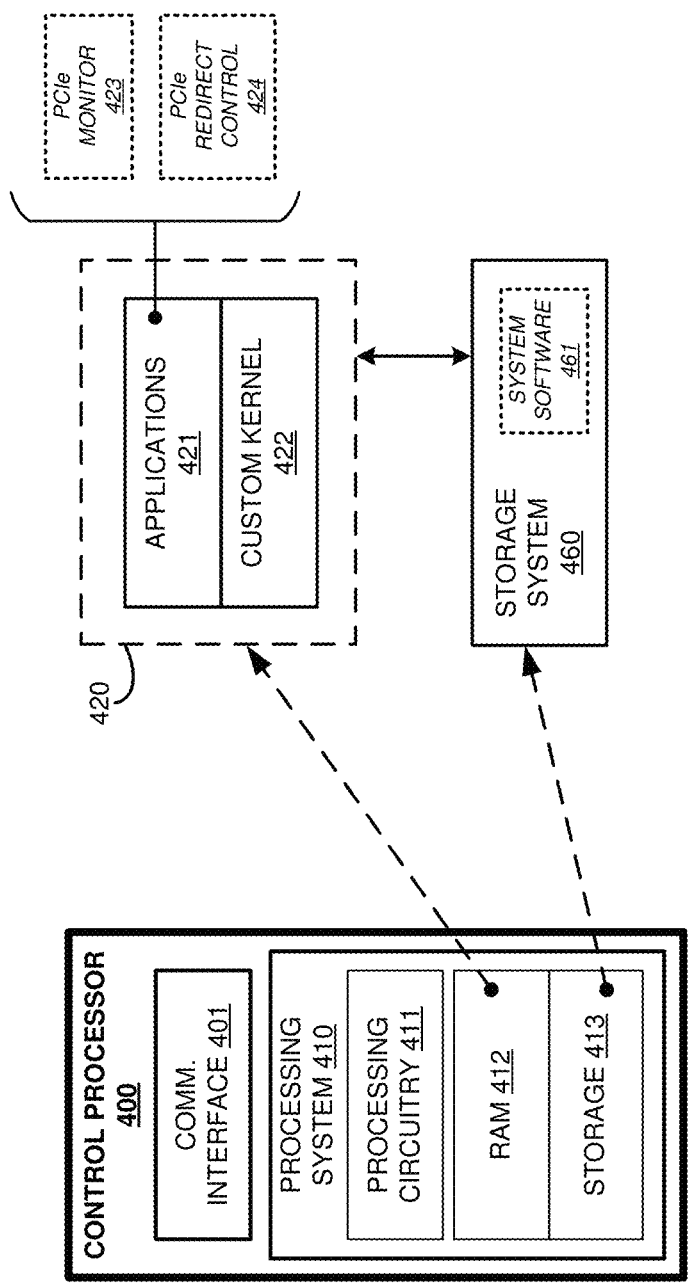
FIG. 4 is a block diagram illustrating a processing system.

FIG. 4 is a block diagram illustrating control processor 400. Control processor 400 illustrates an example of any of the control modules or processors discussed herein, such as processor 211 of FIGS. 2 and 3. In addition, control processor 400 can be illustrative of any processing system a connectivity card discussed herein.

Control processor 400 includes communication interface 401 and processing system 410. Processing system 410 includes processing circuitry 411, random access memory (RAM) 412, and storage 413, although further elements can be included. Example contents of RAM 412 are further detailed in RAM space 420, and example contents of storage 413 are further detailed in storage system 460.

Processing circuitry 411 can be implemented within a single processing device but can also be distributed across multiple processing devices or sub-systems that cooperate in executing program instructions. Examples of processing circuitry 411 include general purpose central processing units, microprocessors, application specific processors, and logic devices, as well as any other type of processing device. In some examples, processing circuitry 411 includes physically distributed processing devices, such as cloud computing systems.

Communication interface 401 includes one or more communication and network interfaces for communicating over communication links, networks, such as packet networks, the Internet, and the like. The communication interfaces can include PCIe interfaces, serial links, such as SPI links, I2C links, USB links, UART links, or one or more local or wide area network communication interfaces which can communicate over Ethernet or Internet protocol (IP) links. Communication interface 401 can include network interfaces configured to communicate using one or more network addresses, which can be associated with different network links. Examples of communication interface 401 include network interface card equipment, transceivers, modems, and other communication circuitry.

RAM 412 and storage 413 together can comprise a non-transitory data storage system, although variations are possible. RAM 412 and storage 413 can each comprise any storage media readable by processing circuitry 411 and capable of storing software. RAM 412 can include volatile and nonvolatile, removable and non-removable media implemented in any method or technology for storage of information, such as computer readable instructions, data structures, program modules, or other data. Storage 413 can include nonvolatile storage media, such as solid-state storage media, flash memory, phase change memory, or magnetic memory, including combinations thereof. RAM 412 and storage 413 can each be implemented as a single storage device but can also be implemented across multiple storage devices or sub-systems. RAM 412 and storage 413 can each comprise additional elements, such as controllers, capable of communicating with processing circuitry 311.

Software stored on or in RAM 412 or storage 413 can comprise computer program instructions, firmware, or some other form of machine-readable processing instructions having processes that when executed a processing system direct control processor 400 to operate as described herein. For example, software can drive processor 400 to monitor operating statistics and status for various PCIe traffic and other modules, monitor for connectivity issues that arise with regard to the plurality of PCIe connectors, and responsively mitigate the connectivity issues by at least reconfiguring a communication pathway in the PCIe switch circuit for at least a portion of the PCIe traffic affected by the connectivity issues, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

RAM space 420 illustrates a detailed view of an example configuration of RAM 412. It should be understood that different configurations are possible. In an example embodiment of the present invention, applications 421 and custom kernel 422 can reside in flash memory and run in an execute in place (XIP) configuration. This enables quick boots while providing sufficient memory to execute telemetry and PCIe monitoring functions. Software applications 423-424 each comprise executable instructions which can be executed by processor 400 for operating a connectivity card or other circuitry according to the operations discussed herein. Specifically, PCIe monitor 423 monitors for connectivity issues that arise with regard to the plurality of PCIe connectors. PCIe redirect control 424 mitigates connectivity issues by at least reconfiguring a communication pathway in the PCIe switch circuit for at least a portion of the PCIe traffic affected by the connectivity issues.

Applications 421 and custom kernel 422 can reside in RAM space 420 during execution and operation of control processor 400, and can reside in storage system 460 during a powered-off state, among other locations and states. Applications 421 and custom kernel 422 can be loaded into RAM space 420 during a startup or boot procedure as described for computer operating systems and applications.

Storage system 460 illustrates a detailed view of an example configuration of storage 413. Storage system 460 can comprise flash memory such as NAND flash or NOR flash memory, phase change memory, magnetic memory, among other solid-state storage technologies. As shown in FIG. 4, storage system 460 includes system software 461.

Control processor 400 is generally intended to represent a computing system with which at least software 461 and 421-424 are deployed and executed in order to render or otherwise implement the operations described herein. However, control processor 400 can also represent any computing system on which at least software 461 and 421-424 can be staged and from where software 461 and 421-424 can be distributed, transported, downloaded, or otherwise provided to yet another computing system for deployment and execution, or yet additional distribution.

Figure 5:
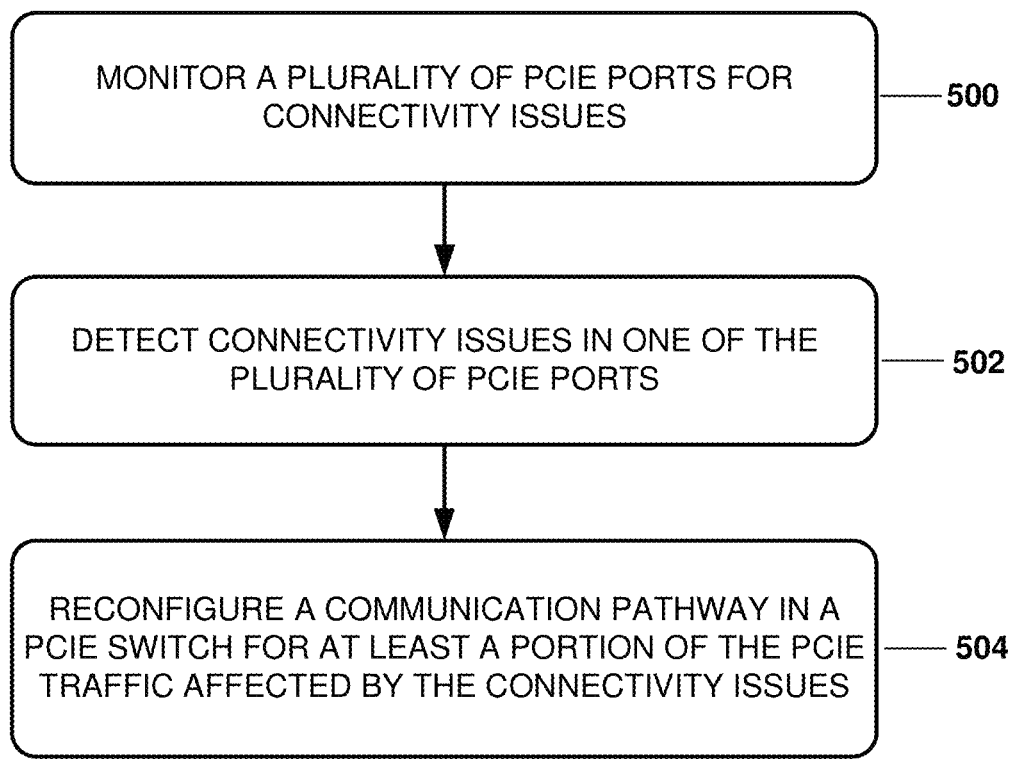
FIG. 5 is a flow diagram illustrating a method of operating a connectivity expansion card.

FIG. 5 is a flow diagram illustrating a method of operating a connectivity card. Operations of FIG. 5 can be performed by any of processor 211, PCIe switch 212, or control processor 400, including combinations thereof. Processor 211 will be discussed below as an exemplary processing system.

In FIG. 5, control processor 400 monitors ports 213 and connector 214 for connectivity issues, (operation 500). Control processor 400 then detects connectivity issues among any of ports 213 and connector 214, (operation 502). These connectivity issues can include cable connectivity, such as when an associated cable connected to ports 213 is disconnected or re-connected. The connectivity issues can include failed internal links, such as when traces or portions of the links or ports internal to card 210 fail or are intermittent. Normally, a connectivity issue—such as connectivity loss—would cause a cascading failure problem for the host, referred to as a host panic condition. Control processor 400 can prevent host panic conditions by isolating the connectivity issue to within PCIe switch circuit 212, and control processor 400 instructs PCIe switch circuit 212 to redirect the affected PCIe traffic to a redundant link, by reconfiguring a communication pathway within PCIe switch circuit 212, (operation 504).

For example, in FIG. 3, expansion card 210 is coupled to two separate rackmount PCIe switches 320-321. If a connectivity issue arises with a cable or other portion associated with a first PCIe link between card 210 and switch 320, then processor 211 can detect this connectivity issue and redirect traffic that was formerly carried over the failed link. This redirection can occur within PCIe switch circuit 212 to redirect the traffic to another link to switch 320, or to another switch 321. The nature of the failure might preclude failure redirection to another link on the same switch 320. In this manner, connectivity failures—such as failed cables, links, or inadvertent cable disconnection, can be isolated from a host system by processor 211 and PCIe switch circuit 212. Processor 211 or control processor 400 can responsively mitigate PCIe connectivity issues by at least reconfiguring a communication pathway in PCIe switch circuit 212 for at least a portion of the PCIe traffic affected by the connectivity issues.

Figure 6A:
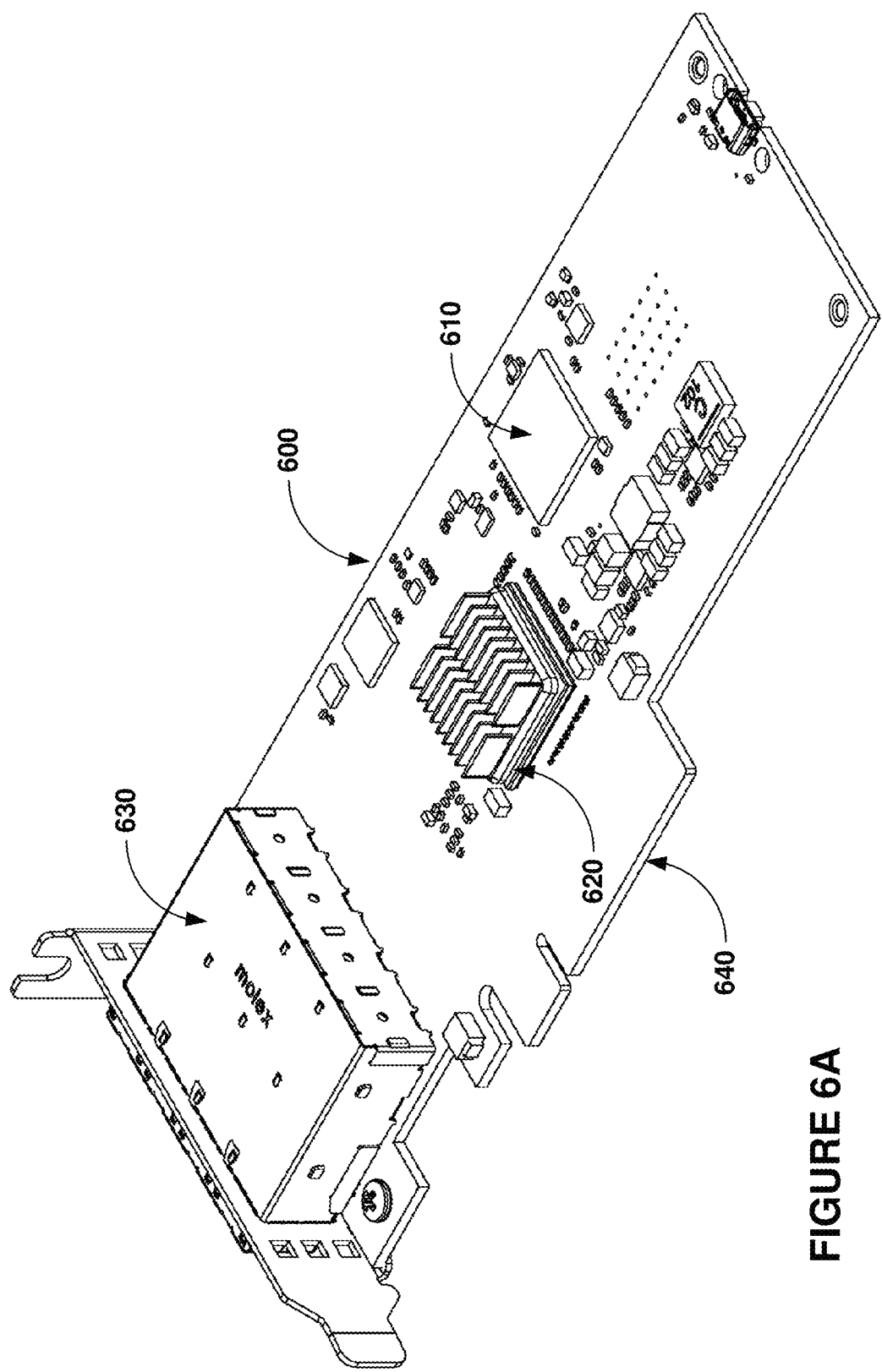
FIG. 6A is an oblique view illustrating a connectivity expansion card.
Figure 6B:
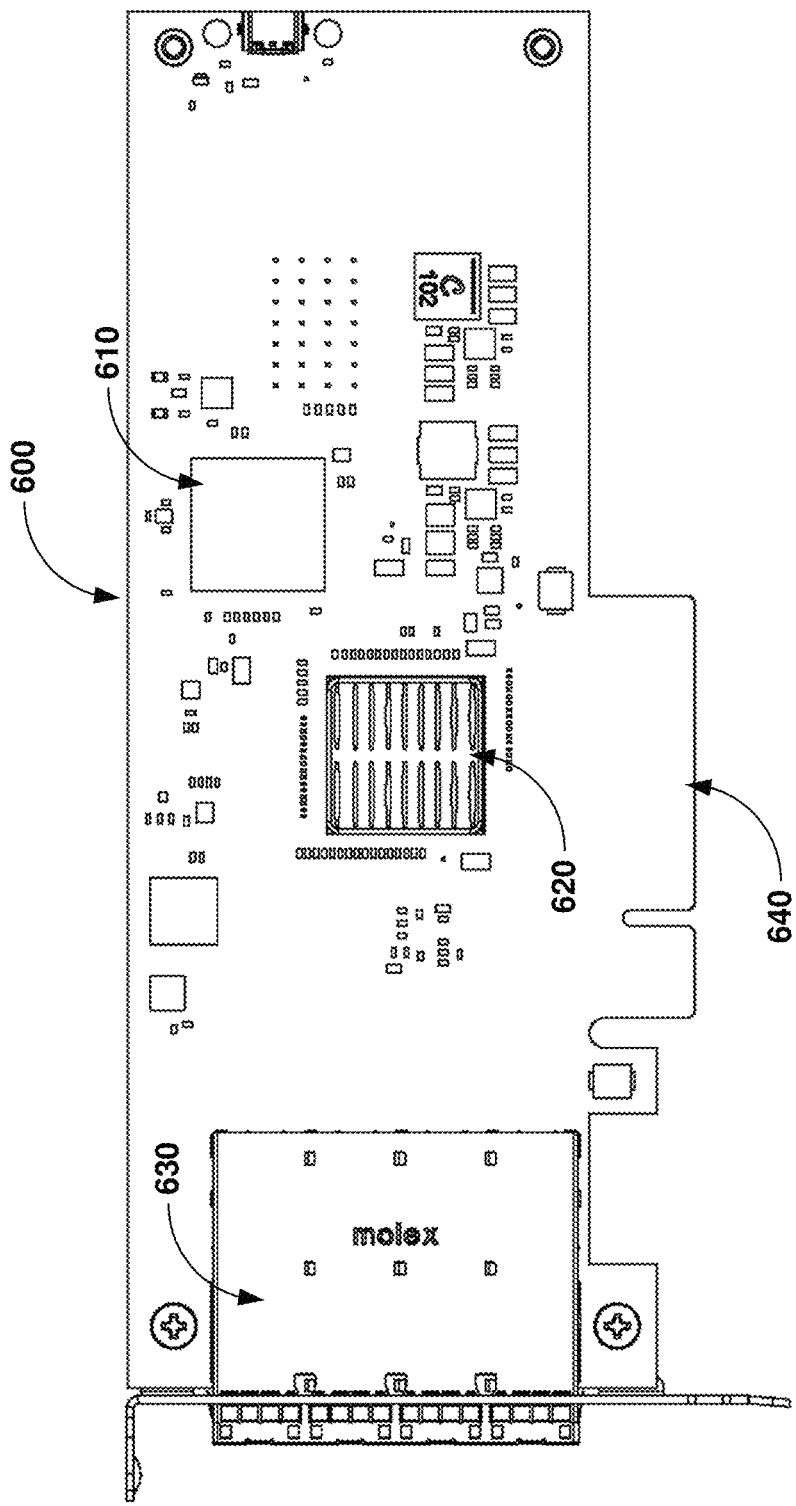
FIG. 6B is a front view illustrating a connectivity expansion card.

FIG. 6A is an oblique view and FIG. 6B is a front view illustrating a connectivity expansion card 600. In this example embodiment of the present invention, connectivity expansion card 600 comprises control processor (or control circuitry) 610, PCIe switch circuit 620, PCIe connectors 630, and host connector 640.

Figure 7A:
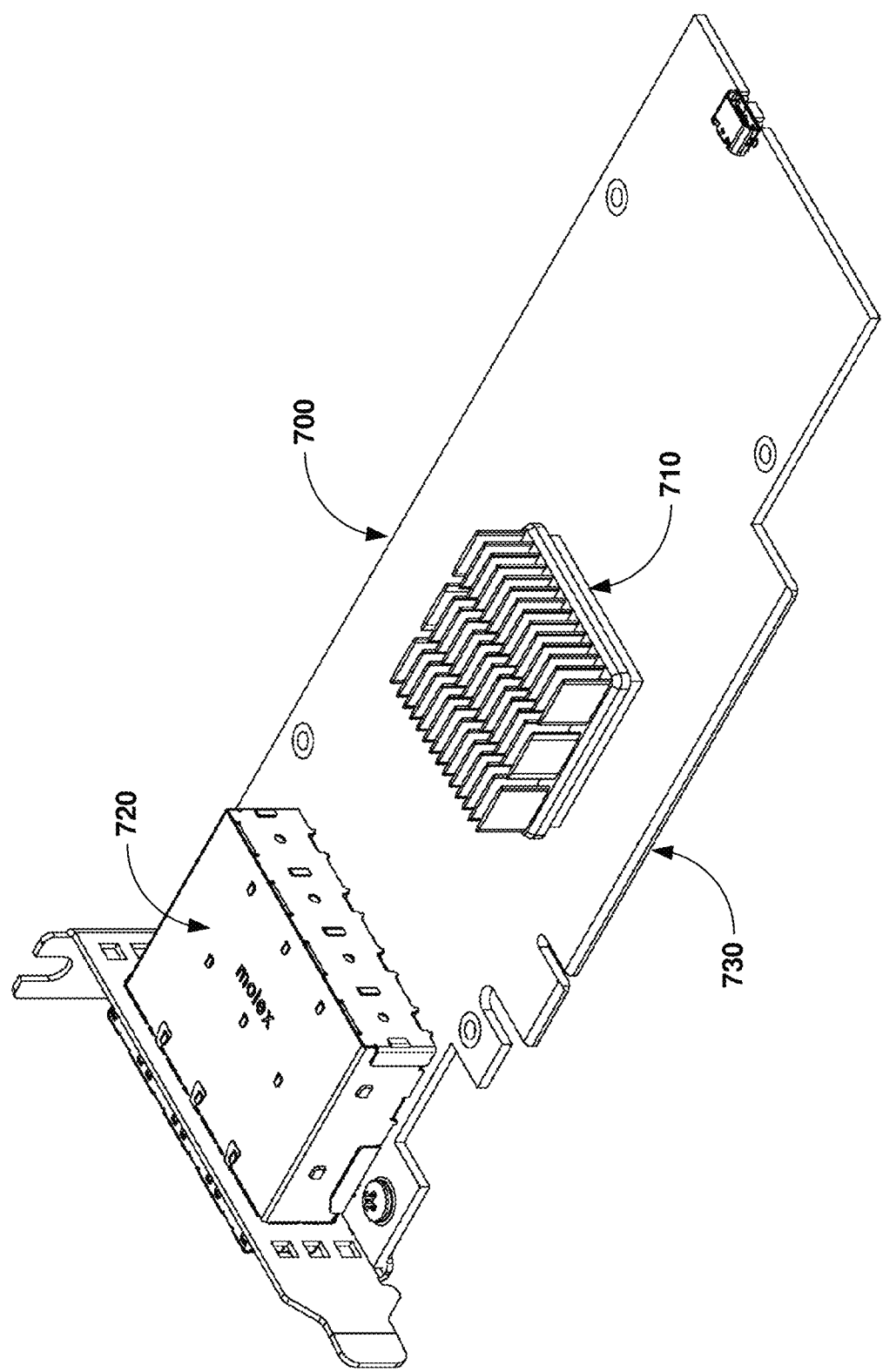
FIG. 7A is an oblique view illustrating a connectivity expansion card.
Figure 7B:
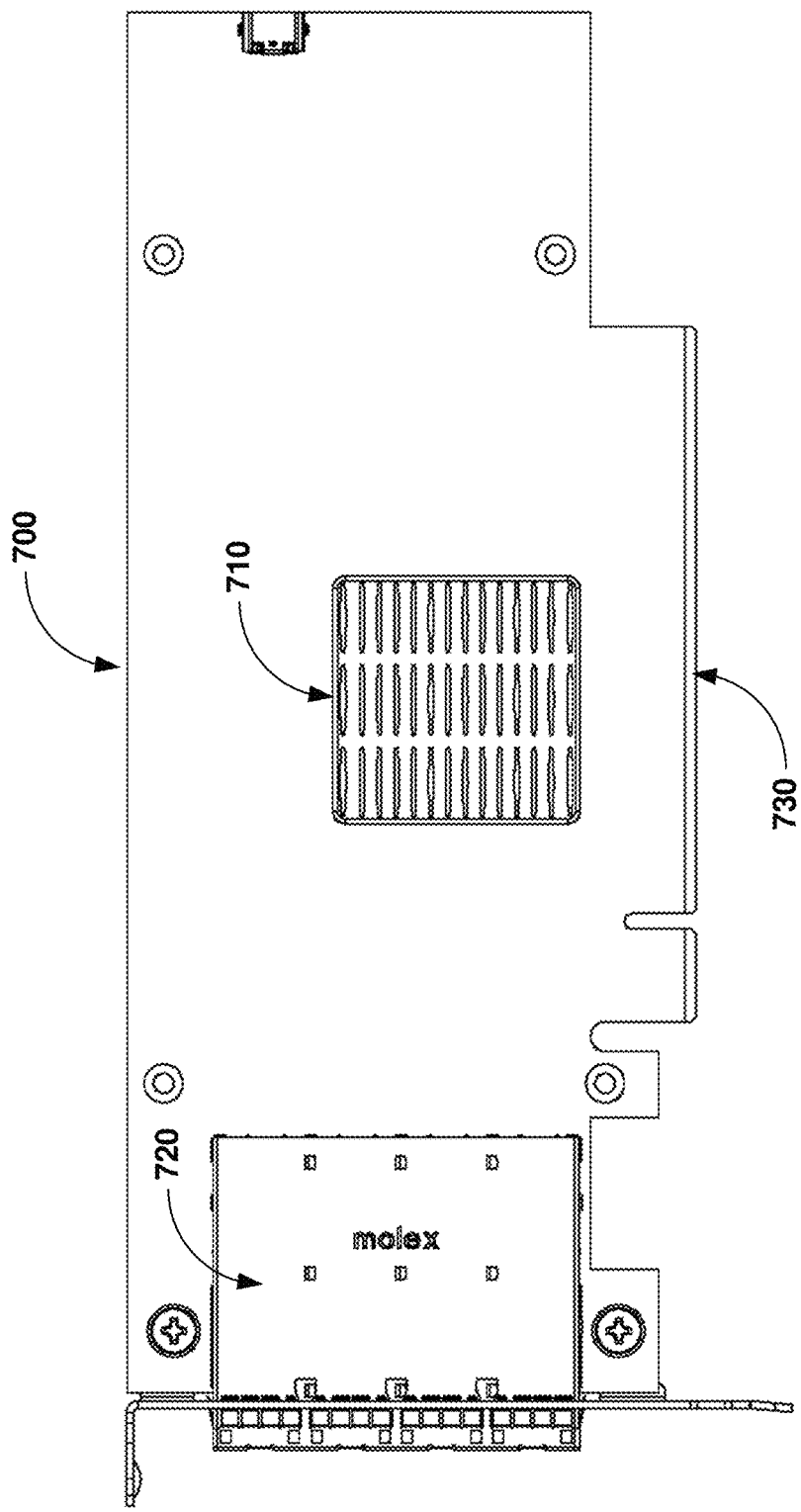
FIG. 7B is a front view illustrating a connectivity expansion card.

FIG. 7A is an oblique view and FIG. 7B is a front view illustrating a connectivity expansion card 700. In this example embodiment of the present invention, connectivity expansion card 700 comprises control processor (or control circuitry) integrated with PCIe switch circuit 710, PCIe connectors 720, and host connector 730.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A connectivity card, comprising:
   a plurality of Peripheral Component Interconnect Express (PCIe) connectors that when the connectivity card is mounted into a chassis of a host system are configured to provide external PCIe ports to couple over one or more cables to systems external to the chassis, each of the plurality of PCIe connectors capable of carrying PCIe traffic;
   a PCIe switch circuit configured to communicatively couple the plurality of connectors to a shared connectivity interface carried over a host connector of the connectivity card; and
   control circuitry configured to monitor for connectivity issues that arise with regard to the one or more cables that couple to the external PCIe ports, and responsively mitigate the connectivity issues by at least reconfiguring a communication pathway in the PCIe switch circuit for at least a portion of the PCIe traffic affected by the connectivity issues.

2. The connectivity card of claim 1, wherein the control circuitry is further configured to mitigate the connectivity issues by determining an identity of an external PCIe port affected by the connectivity issues, and redirecting traffic from the affected external PCIe port to a different external PCIe port.

3. The connectivity card of claim 1, wherein the control circuitry is further configured to determine which external PCIe ports are affected by the connectivity issues and which external PCIe ports are unaffected by the connectivity issues, and redirecting PCIe traffic from the affected external PCIe ports to the unaffected external PCIe ports.

4. The connectivity card of claim 1, wherein the plurality of PCIe connectors comprises at least four PCIe connectors each configured to carry at least a portion of the PCIe traffic over the one or more cables that couple the external PCIe ports to one or more systems external to the host system.

5. The connectivity card of claim 1, wherein the connectivity interface and the host connector comprise a PCIe link with multiple lanes.

6. The connectivity card of claim 5, wherein the PCIe link has four lanes.

7. The connectivity card of claim 1, wherein the connectivity interface and the host connector comprise at least two PCIe links.

8. A method of operating a connectivity card, the method comprising:
monitoring a plurality of Peripheral Component Interconnect Express (PCIe) ports for connectivity issues, each of the plurality of PCIe ports capable of carrying PCIe traffic, and the PCIe ports having corresponding PCIe connectors on the connectivity card that when the connectivity card is mounted into a chassis of a host system provide external PCIe ports to couple over one or more cables to systems external to the chassis;
detecting connectivity issues for the one or more cables that couple to the plurality of PCIe ports; and
mitigating the connectivity issues by reconfiguring a communication pathway in a PCIe switch circuit on the connectivity card for at least a portion of the PCIe traffic affected by the connectivity issues, the PCIe switch circuit configured to communicatively couple the plurality of PCIe ports to a shared connectivity interface carried over a host connector of the connectivity card.

9. The method of claim 8, wherein mitigating the connectivity issues comprises:
determining an identity of an external PCIe port affected by the connectivity issues; and
redirecting traffic from the affected external PCIe port to a different external PCIe port.

10. The method of claim 8, wherein mitigating the connectivity issues comprises:
determining which external PCIe ports are affected by the connectivity issues and which external PCIe ports are unaffected by the connectivity issues; and
redirecting PCIe traffic from the affected external PCIe ports to the unaffected external PCIe ports.

11. The method of claim 8, wherein the plurality of PCIe connectors comprises at least four PCIe connectors each configured to carry at least a portion of the PCIe traffic over the one or more cables that couple the external PCIe ports to one or more systems external to the host system.

12. The method of claim 8, wherein the connectivity interface and the host connector comprise a PCIe link with multiple lanes.

13. The method of claim 12, wherein the PCIe link has four lanes.

14. The method of claim 8, wherein the connectivity interface and the host connector comprise at least two PCIe links.

15. One or more non-transitory computer-readable media having stored thereon program instructions to facilitate operating a connectivity card, wherein the program instructions, when executed by a computing system, direct the computing system to at least:
monitor a plurality of Peripheral Component Interconnect Express (PCIe) ports for connectivity issues, each of the plurality of PCIe ports capable of carrying PCIe traffic, and the PCIe ports having corresponding PCIe connectors on the connectivity card that when the connectivity card is mounted into a chassis of a host system provide external PCIe ports to couple over one or more cables to systems external to the chassis;
detect connectivity issues for the one or more cables that couple to the plurality of PCIe ports; and
mitigate the connectivity issues by reconfiguring a communication pathway in a PCIe switch circuit on the connectivity card for at least a portion of the PCIe traffic affected by the connectivity issues, the PCIe switch circuit configured to communicatively couple the plurality of PCIe ports to a shared connectivity interface carried over a host connector of the connectivity card.

16. The one or more non-transitory computer-readable media of claim 15, wherein the program instructions direct the computing system to mitigate the connectivity issues by:
determining an identity of an external PCIe port affected by the connectivity issues; and
redirecting traffic from the affected external PCIe port to a different external PCIe port.

17. The one or more non-transitory computer-readable media of claim 15, wherein the program instructions direct the computing system to mitigate the connectivity issues by:
determining which external PCIe ports are affected by the connectivity issues and which external PCIe ports are unaffected by the connectivity issues; and
redirecting PCIe traffic from the affected external PCIe ports to the unaffected external PCIe ports.

18. The one or more non-transitory computer-readable media of claim 15, wherein the plurality of PCIe connectors comprises at least four PCIe connectors each configured to carry at least a portion of the PCIe traffic over the one or more cables that couple the external PCIe ports to one or more systems external to the host system.

19. The one or more non-transitory computer-readable media of claim 15, wherein the connectivity interface and the host connector comprise a PCIe link with multiple lanes.

20. The one or more non-transitory computer-readable media of claim 19, wherein the PCIe link has four lanes.

* * * * *